United States Patent
Ahopelto et al.

(10) Patent No.: US 8,949,342 B2
(45) Date of Patent: Feb. 3, 2015

(54) MESSAGING SYSTEM

(75) Inventors: Timo Ahopelto, Helsinki (FI); Donald Peppers, Sea Island, GA (US); Kai Friman, Espoo (FI)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/075,853

(22) Filed: Mar. 14, 2008

(65) Prior Publication Data

US 2008/0195751 A1    Aug. 14, 2008

Related U.S. Application Data

(63) Continuation of application No. 11/888,446, filed on Aug. 1, 2007, now Pat. No. 7,660,862.

(30) Foreign Application Priority Data

Aug. 9, 2006  (GB) .................................. 0615833.1

(51) Int. Cl.
G06F 15/16    (2006.01)
H04L 12/58    (2006.01)

(52) U.S. Cl.
CPC ............ H04L 12/5885 (2013.01); H04L 51/34 (2013.01)
USPC ........................................................ 709/206

(58) Field of Classification Search
CPC .... H04L 51/34; H04L 12/5885; H04N 21/00; H04N 21/45; H04N 21/458; H04N 21/80
USPC ........................................................ 709/206
See application file for complete search history.

(56) References Cited

U.S. PATENT DOCUMENTS

| 5,408,519 A | 4/1995 | Pierce et al. |
| 5,613,213 A | 3/1997 | Naddell et al. |
| 5,678,179 A | 10/1997 | Turcotte et al. |
| 5,974,398 A | 10/1999 | Hanson |

(Continued)

FOREIGN PATENT DOCUMENTS

| DE | 199 41 461 A1 | 3/2001 |
| DE | 10061984 | 6/2002 |

(Continued)

OTHER PUBLICATIONS

U.K. Search Report under Section 17 dated Nov. 20, 2006 issued in connection with corresponding U.K. Application No. GB 0615833.1.

(Continued)

*Primary Examiner* — Esther Benoit
(74) *Attorney, Agent, or Firm* — Novak Druce Connolly Bove + Quigg LLP

(57) ABSTRACT

A method of selecting a recipient of a message on the basis of data identifying access to previously transmitted messages, wherein each said message includes content data for display within a display area of a receiving terminal and control data including data indicative of a user selectable portion within the display area. The method includes receiving content data having one of a plurality of different types for use in creating said message, accessing tracking data corresponding to a previously transmitted message containing content data of a given type, the tracking data being indicative of selection of said user selectable portion upon display thereof at said receiving terminal, and selecting a recipient of the message on the basis of the received content data and the tracking data.

36 Claims, 5 Drawing Sheets

(56) References Cited

U.S. PATENT DOCUMENTS

| | | |
|---|---|---|
| 5,978,775 A | 11/1999 | Chen |
| 5,978,833 A | 11/1999 | Pashley et al. |
| 6,006,197 A | 12/1999 | d'Eon et al. |
| 6,009,410 A | 12/1999 | LeMole et al. |
| 6,015,344 A | 1/2000 | Kelly |
| 6,023,700 A | 2/2000 | Owens et al. |
| 6,029,195 A * | 2/2000 | Herz ............................ 725/116 |
| 6,057,872 A | 5/2000 | Candelore |
| 6,097,942 A | 8/2000 | Laiho |
| 6,202,086 B1 * | 3/2001 | Maruyama et al. ........... 709/206 |
| 6,253,189 B1 | 6/2001 | Feezell et al. |
| 6,286,005 B1 | 9/2001 | Cannon |
| 6,334,145 B1 | 12/2001 | Adams et al. |
| 6,345,279 B1 | 2/2002 | Li et al. |
| 6,381,465 B1 | 4/2002 | Chern et al. |
| 6,446,261 B1 | 9/2002 | Rosser |
| 6,502,076 B1 | 12/2002 | Smith |
| 6,564,261 B1 | 5/2003 | Gudjonsson |
| 6,598,228 B2 | 7/2003 | Hejna |
| 6,647,269 B2 | 11/2003 | Hendrey et al. |
| 6,684,249 B1 | 1/2004 | Frerichs et al. |
| 6,698,020 B1 | 2/2004 | Zigmond et al. |
| 6,718,551 B1 | 4/2004 | Swix et al. |
| 6,820,204 B1 | 11/2004 | Desai |
| 6,889,054 B2 | 5/2005 | Himmel et al. |
| 6,920,326 B2 | 7/2005 | Agarwal et al. |
| 7,016,864 B1 | 3/2006 | Notz et al. |
| 7,028,001 B1 | 4/2006 | Muthuswamy et al. |
| 7,039,599 B2 | 5/2006 | Merriman et al. |
| 7,072,947 B1 | 7/2006 | Knox et al. |
| 7,076,445 B1 | 7/2006 | Cartwright |
| 7,149,537 B1 | 12/2006 | Kupsh et al. |
| 7,155,243 B2 * | 12/2006 | Baldwin et al. ............... 455/466 |
| 7,200,633 B2 | 4/2007 | Sekiguchi et al. |
| 7,263,535 B2 | 8/2007 | Malik |
| 7,280,818 B2 | 10/2007 | Clayton |
| 7,280,979 B1 | 10/2007 | Katz |
| 7,349,527 B2 | 3/2008 | Yacoub et al. |
| 7,386,485 B1 | 6/2008 | Mussman |
| 7,539,652 B2 | 5/2009 | Flinn et al. |
| 7,555,563 B2 * | 6/2009 | Ott et al. ........................ 709/240 |
| 7,558,559 B2 | 7/2009 | Alston |
| 7,730,017 B2 | 6/2010 | Nance et al. |
| 7,730,149 B2 | 6/2010 | Aaltonen |
| 7,734,632 B2 | 6/2010 | Wang |
| 7,774,419 B2 | 8/2010 | Aaltonen |
| 7,933,799 B2 | 4/2011 | Aaltonen et al. |
| 7,974,988 B2 | 7/2011 | Nandiwada et al. |
| 8,099,490 B2 | 1/2012 | Deakin |
| 2001/0047272 A1 | 11/2001 | Frietas et al. |
| 2001/0049653 A1 | 12/2001 | Sheets |
| 2001/0051925 A1 | 12/2001 | Kang |
| 2002/0004743 A1 | 1/2002 | Kutaragi |
| 2002/0010645 A1 | 1/2002 | Hagen et al. |
| 2002/0026356 A1 | 2/2002 | Bergh |
| 2002/0029249 A1 | 3/2002 | Campbell et al. |
| 2002/0032602 A1 | 3/2002 | Lanzillo, Jr. et al. |
| 2002/0046341 A1 | 4/2002 | Kazaks |
| 2002/0052788 A1 | 5/2002 | Perkes |
| 2002/0077130 A1 * | 6/2002 | Owensby ....................... 455/466 |
| 2002/0083411 A1 | 6/2002 | Bouthers et al. |
| 2002/0087335 A1 | 7/2002 | Meyers et al. |
| 2002/0099842 A1 | 7/2002 | Jennings et al. |
| 2002/0111177 A1 | 8/2002 | Castres |
| 2002/0120498 A1 | 8/2002 | Gordon et al. |
| 2002/0128907 A1 | 9/2002 | Sato et al. |
| 2002/0128908 A1 | 9/2002 | Levin et al. |
| 2002/0137507 A1 | 9/2002 | Winkler |
| 2002/0138291 A1 | 9/2002 | Vaidyanathan et al. |
| 2002/0138400 A1 | 9/2002 | Kitchen |
| 2002/0161770 A1 | 10/2002 | Shapiro et al. |
| 2003/0003935 A1 | 1/2003 | Vesikivi et al. |
| 2003/0023489 A1 | 1/2003 | McGuire et al. |
| 2003/0028597 A1 | 2/2003 | Salmi |
| 2003/0032409 A1 * | 2/2003 | Hutcheson et al. ............ 455/414 |
| 2003/0037103 A1 | 2/2003 | Salmi |
| 2003/0040297 A1 | 2/2003 | Pecen et al. |
| 2003/0040300 A1 | 2/2003 | Bodic et al. |
| 2003/0083931 A1 | 5/2003 | Lang |
| 2003/0110171 A1 | 6/2003 | Ozer et al. |
| 2003/0126079 A1 | 7/2003 | Roberson |
| 2003/0126146 A1 | 7/2003 | Van Der Riet |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2003/0208754 A1 | 11/2003 | Sridhar |
| 2003/0220946 A1 | 11/2003 | Malik |
| 2004/0003398 A1 | 1/2004 | Donian et al. |
| 2004/0019637 A1 | 1/2004 | Goodman |
| 2004/0043777 A1 | 3/2004 | Brouwer et al. |
| 2004/0054576 A1 | 3/2004 | Kanerva et al. |
| 2004/0068435 A1 | 4/2004 | Braunzell |
| 2004/0103157 A1 * | 5/2004 | Requena et al. ............... 709/206 |
| 2004/0107256 A1 | 6/2004 | Odenwald |
| 2004/0128353 A1 | 7/2004 | Goodman |
| 2004/0133480 A1 | 7/2004 | Domes |
| 2004/0136358 A1 | 7/2004 | Hind et al. |
| 2004/0158612 A1 | 8/2004 | Concannon |
| 2004/0158858 A1 | 8/2004 | Paxton et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0240649 A1 | 12/2004 | Goel |
| 2004/0254993 A1 | 12/2004 | Mamas |
| 2004/0254994 A1 * | 12/2004 | Diorio et al. ................... 709/206 |
| 2004/0259526 A1 | 12/2004 | Goris et al. |
| 2004/0267806 A1 | 12/2004 | Lester |
| 2005/0004840 A1 * | 1/2005 | Wanninger ...................... 705/14 |
| 2005/0010641 A1 | 1/2005 | Staack |
| 2005/0027676 A1 | 2/2005 | Eichstaedt et al. |
| 2005/0033700 A1 | 2/2005 | Vogler |
| 2005/0060425 A1 | 3/2005 | Yeh et al. |
| 2005/0075929 A1 | 4/2005 | Wolinsky et al. |
| 2005/0119936 A1 | 6/2005 | Buchanan |
| 2005/0125397 A1 | 6/2005 | Gross et al. |
| 2005/0160165 A1 | 7/2005 | Chen |
| 2005/0170856 A1 | 8/2005 | Keyani et al. |
| 2005/0192008 A1 | 9/2005 | Desai |
| 2005/0228739 A1 | 10/2005 | Leibowitz |
| 2005/0229209 A1 | 10/2005 | Hildebolt et al. |
| 2005/0233776 A1 | 10/2005 | Allen |
| 2005/0245241 A1 | 11/2005 | Durand et al. |
| 2005/0249216 A1 | 11/2005 | Jones |
| 2005/0267798 A1 | 12/2005 | Panara |
| 2005/0273833 A1 | 12/2005 | Soinio |
| 2005/0281237 A1 | 12/2005 | Heinonen et al. |
| 2005/0289113 A1 | 12/2005 | Bookstaff |
| 2006/0025163 A1 | 2/2006 | Smith et al. |
| 2006/0031164 A1 | 2/2006 | Kim |
| 2006/0031327 A1 | 2/2006 | Kredo |
| 2006/0041470 A1 | 2/2006 | Filho et al. |
| 2006/0053208 A1 | 3/2006 | Laurila |
| 2006/0053225 A1 | 3/2006 | Poikselka |
| 2006/0075425 A1 | 4/2006 | Koch et al. |
| 2006/0085395 A1 | 4/2006 | Cradick et al. |
| 2006/0089948 A1 * | 4/2006 | Picker et al. ............... 707/103 R |
| 2006/0095511 A1 | 5/2006 | Munarriz et al. |
| 2006/0123014 A1 | 6/2006 | Ng |
| 2006/0129455 A1 | 6/2006 | Shah |
| 2006/0141923 A1 | 6/2006 | Goss |
| 2006/0161189 A1 | 7/2006 | Harp |
| 2006/0161599 A1 | 7/2006 | Rosen |
| 2006/0168616 A1 | 7/2006 | Candelore |
| 2006/0190331 A1 * | 8/2006 | Tollinger et al. ................. 705/14 |
| 2006/0194595 A1 * | 8/2006 | Myllynen et al. .............. 455/466 |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0212583 A1 | 9/2006 | Beadle |

(56) References Cited

U.S. PATENT DOCUMENTS

| | | |
|---|---|---|
| 2006/0240850 A1 | 10/2006 | Kaplan |
| 2006/0253327 A1 | 11/2006 | Morris et al. |
| 2006/0276170 A1 | 12/2006 | Radhakrishnan et al. |
| 2006/0276213 A1 | 12/2006 | Gottschalk |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0004380 A1 | 1/2007 | Ylikoski |
| 2007/0011344 A1 | 1/2007 | Paka et al. |
| 2007/0016488 A1 | 1/2007 | Ulenas |
| 2007/0022021 A1 | 1/2007 | Walker et al. |
| 2007/0027703 A1 | 2/2007 | Hu et al. |
| 2007/0027760 A1 | 2/2007 | Collins et al. |
| 2007/0027762 A1 | 2/2007 | Collins et al. |
| 2007/0033104 A1 | 2/2007 | Collins et al. |
| 2007/0038711 A1* | 2/2007 | MacBeth et al. .............. 709/206 |
| 2007/0047523 A1 | 3/2007 | Jiang |
| 2007/0055565 A1 | 3/2007 | Baur et al. |
| 2007/0061195 A1 | 3/2007 | Liu et al. |
| 2007/0066295 A1 | 3/2007 | Wennberg |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0094066 A1 | 4/2007 | Kumar et al. |
| 2007/0100653 A1 | 5/2007 | Ramer |
| 2007/0100805 A1 | 5/2007 | Ramer et al. |
| 2007/0105536 A1 | 5/2007 | Tingo, Jr. |
| 2007/0113243 A1 | 5/2007 | Brey |
| 2007/0117571 A1 | 5/2007 | Musial |
| 2007/0136457 A1 | 6/2007 | Dai et al. |
| 2007/0149208 A1 | 6/2007 | Syrbe et al. |
| 2007/0174295 A1 | 7/2007 | Abraham et al. |
| 2007/0179819 A1 | 8/2007 | Bradley et al. |
| 2007/0192409 A1 | 8/2007 | Kleinstern et al. |
| 2007/0214470 A1 | 9/2007 | Glasgow et al. |
| 2007/0226097 A1 | 9/2007 | Keechle |
| 2007/0237330 A1 | 10/2007 | Srivastava |
| 2007/0260624 A1 | 11/2007 | Chung et al. |
| 2007/0288950 A1 | 12/2007 | Downey et al. |
| 2007/0290787 A1 | 12/2007 | Fiatal et al. |
| 2008/0004046 A1 | 1/2008 | Mumick et al. |
| 2008/0010117 A1* | 1/2008 | Oliveira et al. ................. 705/14 |
| 2008/0013537 A1 | 1/2008 | Dewey et al. |
| 2008/0019516 A1 | 1/2008 | Fransdonk |
| 2008/0032703 A1 | 2/2008 | Krumm et al. |
| 2008/0032717 A1 | 2/2008 | Sawada et al. |
| 2008/0040227 A1* | 2/2008 | Ostermann et al. .............. 705/14 |
| 2008/0052158 A1 | 2/2008 | Ferro et al. |
| 2008/0057920 A1 | 3/2008 | Pettit et al. |
| 2008/0065491 A1 | 3/2008 | Bakman |
| 2008/0070579 A1 | 3/2008 | Kankar et al. |
| 2008/0071875 A1 | 3/2008 | Koff et al. |
| 2008/0071929 A1 | 3/2008 | Motte et al. |
| 2008/0082686 A1 | 4/2008 | Schmidt et al. |
| 2008/0086369 A1 | 4/2008 | Kiat et al. |
| 2008/0091796 A1 | 4/2008 | Story |
| 2008/0109519 A1 | 5/2008 | Aaltonen |
| 2008/0114639 A1 | 5/2008 | Meek et al. |
| 2008/0134043 A1 | 6/2008 | Georgis et al. |
| 2008/0140508 A1 | 6/2008 | Anand et al. |
| 2008/0215436 A1 | 9/2008 | Roberts |
| 2008/0228568 A1 | 9/2008 | Williams et al. |
| 2008/0235342 A1 | 9/2008 | Aaltonen |
| 2008/0243619 A1 | 10/2008 | Sharman et al. |
| 2008/0244024 A1 | 10/2008 | Aaltonen |
| 2008/0249832 A1 | 10/2008 | Richardson et al. |
| 2008/0271068 A1 | 10/2008 | Ou et al. |
| 2008/0319836 A1 | 12/2008 | Aaltonen et al. |
| 2009/0006194 A1 | 1/2009 | Sridharan et al. |
| 2009/0029721 A1 | 1/2009 | Doraswamy |
| 2009/0049090 A1 | 2/2009 | Shenfield et al. |
| 2009/0063249 A1 | 3/2009 | Tomlin et al. |
| 2009/0106111 A1 | 4/2009 | Walk et al. |
| 2009/0125377 A1 | 5/2009 | Somji et al. |
| 2009/0132395 A1 | 5/2009 | Lam et al. |
| 2009/0138304 A1 | 5/2009 | Aharoni et al. |
| 2009/0141875 A1 | 6/2009 | Demmitt et al. |
| 2009/0197619 A1 | 8/2009 | Colligan et al. |
| 2009/0216847 A1 | 8/2009 | Krishnaswamy et al. |
| 2009/0240677 A1 | 9/2009 | Parekh et al. |
| 2009/0275315 A1 | 11/2009 | Alston |
| 2009/0286520 A1 | 11/2009 | Nielsen et al. |
| 2009/0287619 A1 | 11/2009 | Liang et al. |
| 2009/0298483 A1 | 12/2009 | Bratu et al. |
| 2010/0010887 A1* | 1/2010 | Karlin et al. ............... 705/14.15 |
| 2010/0082397 A1 | 4/2010 | Blegen |
| 2010/0082423 A1 | 4/2010 | Nag et al. |
| 2010/0088152 A1 | 4/2010 | Bennett |
| 2010/0114654 A1 | 5/2010 | Lukose et al. |
| 2010/0125505 A1 | 5/2010 | Puttaswamy |
| 2010/0138271 A1 | 6/2010 | Henkin |
| 2010/0145936 A1 | 6/2010 | Grinstein et al. |
| 2010/0153216 A1 | 6/2010 | Liang et al. |
| 2010/0161424 A1 | 6/2010 | Sylvain |
| 2010/0169157 A1 | 7/2010 | Muhonen et al. |
| 2010/0169176 A1 | 7/2010 | Turakhia |
| 2010/0205541 A1 | 8/2010 | Rapaport et al. |
| 2010/0228603 A1 | 9/2010 | Bolder et al. |
| 2011/0087526 A1 | 4/2011 | Morgenstern et al. |
| 2011/0106840 A1 | 5/2011 | Barrett et al. |
| 2011/0145059 A1 | 6/2011 | Baluja |
| 2011/0209067 A1 | 8/2011 | Bogess et al. |
| 2011/0225048 A1 | 9/2011 | Nair |
| 2011/0238485 A1 | 9/2011 | Haumont et al. |
| 2011/0276401 A1 | 11/2011 | Knowles et al. |

FOREIGN PATENT DOCUMENTS

| | | |
|---|---|---|
| EP | 0831629 | 3/1998 |
| EP | 1043905 | 10/2000 |
| EP | 1 073 293 A1 | 1/2001 |
| EP | 1 109 371 A2 | 6/2001 |
| EP | 1107137 | 6/2001 |
| EP | 1 161 093 A2 | 12/2001 |
| EP | 1182845 | 2/2002 |
| EP | 1 193 955 A2 | 4/2002 |
| EP | 1195701 | 4/2002 |
| EP | 1 220 132 A2 | 7/2002 |
| EP | 1 239 395 A2 | 9/2002 |
| EP | 1239392 | 9/2002 |
| EP | 1 253 542 A2 | 10/2002 |
| EP | 1 298 945 A1 | 4/2003 |
| EP | 1303107 | 4/2003 |
| EP | 1 324 250 A1 | 7/2003 |
| EP | 1 365 604 A2 | 11/2003 |
| EP | 1408705 | 4/2004 |
| EP | 1 455 511 A1 | 9/2004 |
| EP | 1509024 | 2/2005 |
| EP | 1 542 482 A2 | 6/2005 |
| EP | 1 587 332 A1 | 10/2005 |
| EP | 1594287 | 11/2005 |
| EP | 1 613 102 A1 | 1/2006 |
| EP | 1 615 455 A1 | 1/2006 |
| EP | 1 633 100 A1 | 3/2006 |
| EP | 1677475 | 7/2006 |
| FR | 2867931 | 9/2005 |
| GB | 2343051 | 4/2000 |
| GB | 2 352 856 A | 2/2001 |
| GB | 2 356 777 A | 5/2001 |
| GB | 2369218 | 5/2002 |
| GB | 2 383 149 A | 6/2003 |
| GB | 2386509 | 9/2003 |
| GB | 2 406 996 A | 4/2005 |
| GB | 2 407 002 A | 4/2005 |
| GB | 2414621 | 11/2005 |
| GB | 2416887 | 2/2006 |
| GB | 2424546 | 9/2006 |
| JP | 2002/140272 | 5/2002 |
| JP | 2007-087138 | 4/2007 |

(56) References Cited

FOREIGN PATENT DOCUMENTS

| | | |
|---|---|---|
| JP | 2007-199821 | 8/2007 |
| WO | 89/10610 | 11/1989 |
| WO | WO 96/24213 | 8/1996 |
| WO | WO 97/33421 | 9/1997 |
| WO | WO 98/37685 | 8/1998 |
| WO | WO 00/44151 A2 | 7/2000 |
| WO | 0070848 | 11/2000 |
| WO | WO 01/22748 A1 | 3/2001 |
| WO | WO 01/31497 A1 | 5/2001 |
| WO | 01/52161 | 7/2001 |
| WO | WO 01/55892 A1 | 8/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/77840 A1 | 10/2001 |
| WO | WO 01/78425 A1 | 10/2001 |
| WO | WO 01/91400 A2 | 11/2001 |
| WO | WO 01/93551 A2 | 12/2001 |
| WO | WO 01/97539 A2 | 12/2001 |
| WO | 02/09431 | 1/2002 |
| WO | WO 02/31624 A2 | 4/2002 |
| WO | 02/35324 | 5/2002 |
| WO | 02/50632 | 6/2002 |
| WO | WO 02/44834 A2 | 6/2002 |
| WO | WO 02/054803 A1 | 7/2002 |
| WO | WO 02/059720 A1 | 8/2002 |
| WO | 02/069651 | 9/2002 |
| WO | WO 02/069585 A2 | 9/2002 |
| WO | WO 02/075574 A1 | 9/2002 |
| WO | 02/086664 | 10/2002 |
| WO | WO 02/080595 A1 | 10/2002 |
| WO | WO 02/084895 A1 | 10/2002 |
| WO | 02/100121 | 12/2002 |
| WO | WO 03/015430 A1 | 2/2003 |
| WO | WO 03/019845 A2 | 3/2003 |
| WO | WO 03/024136 A1 | 3/2003 |
| WO | 03/073304 | 4/2003 |
| WO | WO 03/038638 A1 | 5/2003 |
| WO | 03/049461 | 6/2003 |
| WO | 03058458 | 7/2003 |
| WO | 03/088690 | 10/2003 |
| WO | WO 03/088690 A1 | 10/2003 |
| WO | WO 2004/034671 A1 | 4/2004 |
| WO | WO 2004/054205 A1 | 6/2004 |
| WO | 2004/057578 | 7/2004 |
| WO | WO 2004/084532 A1 | 9/2004 |
| WO | 2004/093044 | 10/2004 |
| WO | WO 2004/086791 A1 | 10/2004 |
| WO | 2004/102993 | 11/2004 |
| WO | WO 2004/100470 A1 | 11/2004 |
| WO | WO 2004/100521 A1 | 11/2004 |
| WO | 2004104867 | 12/2004 |
| WO | WO 2004/114109 A1 | 12/2004 |
| WO | WO 2005/015806 A2 | 2/2005 |
| WO | 2005/020578 | 3/2005 |
| WO | WO 2005/029769 A1 | 3/2005 |
| WO | WO 2005/062637 A1 | 7/2005 |
| WO | WO 2005/076650 A1 | 8/2005 |
| WO | WO 2006/002869 A1 | 1/2006 |
| WO | WO 2006/005001 A2 | 1/2006 |
| WO | 2006/011164 | 2/2006 |
| WO | 2006/016189 | 2/2006 |
| WO | WO 2006/026505 A2 | 3/2006 |
| WO | WO 2006/027407 A1 | 3/2006 |
| WO | 2006/040749 | 4/2006 |
| WO | WO 2006/093284 A1 | 9/2006 |
| WO | 2006/105202 | 10/2006 |
| WO | WO 2006/110446 A1 | 10/2006 |
| WO | WO 2006/119481 A2 | 11/2006 |
| WO | 2007001118 | 1/2007 |
| WO | 2007/031708 | 3/2007 |
| WO | WO 2007/056698 A2 | 5/2007 |
| WO | WO 2008/013437 A1 | 1/2008 |
| WO | 2008/024852 | 2/2008 |
| WO | 2008/045867 | 4/2008 |
| WO | 2008/053062 | 5/2008 |
| WO | 2008/147919 | 12/2008 |
| WO | 2009/009507 | 1/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS

U.K. Search Report under Section 17 dated Apr. 17, 2007 issued in connection with corresponding U.K. Application No. GB 0705651.8.
International Search Report (Form PCT/ISA/206) issued in connection with corresponding International Application PCT/EP2007/058243.
International Search Report (Form PCT/ISA/210) mailed Feb. 7, 2008 issued in connection with corresponding International Application PCT/EP2007/058243.
Office Action dated Mar. 3, 2009 issued in related U.S. Appl. No. 12/075,862 (24 pages).
Official Communication Pursuant to Article 94(3) EPC from European Patent Office dated Nov. 21, 2008 issued in connection with counterpart European Application No. 08 802 544.2 (7 pages).
Office Action from the U.S. Patent and Trademark Office dated Jun. 4, 2009 in related U.S. Appl. No. 11/888,446 (43 pages).
Communication Pursuant to Article 94(3) EPC dated Nov. 21, 2008 issued by the European Patent Office in connection with counterpart European Application No. 08 802 544.2, written at the European Patent Office in Munich, Germany (7 Pages).
Communication Pursuant to Article 94(3) EPC dated Aug. 13, 2009 issued by the European Patent Office in related European Patent Application No. 07 802 544.2 (4 pages).
PCT Notification of Transmittal of the International Search Report and the Written Opinion of the International Searching Authority, or the Declaration (3 pgs), PCT International Search Report (2 pgs), and PCT Written Opinion of the International Searching Authority (8 pgs) mailed Jun. 19, 2009 on a related foreign PCT application PCT/EP2008/056069 issued by PCT International Searching Authority.
Office Action dated Sep. 3, 2009 issued in related U.S. Appl. No. 12/075,862 (19 pages).
Communication pursuant to Article 94(3) EPC issued Jan. 14, 2011 by the European Patent Office in related European Application No. 08 761 022.6 (6 pages).
"On the Design and Evaluation of Job Scheduling Algorithms," Jochen Krallman, Uwe Schwiegelshohn and Ramin Yahyapour, Lecture Notes in Computer Science, vol. 1659, Jan. 1, 1999, pp. 17-42 (26 pages).
"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.
Combined Search and Examination Report under Sections 17 and 18(3), U.K. Patent Office in related U.K Application No. GB 0818647.0, dated Jan. 7, 2009.
Communication Pursuant to Article 94(3) EPC, European Patent Application No. 07 822 138.9, dated Mar. 8, 2010.
Communication pursuant to Article 94(3) EPC, European Patent Application No. 07 822 138.9 (4 pages), dated Mar. 10, 2011.
Communication (European Search Report), European Patent Application EP 08 15 6763, dated Oct. 17, 2008.
PCT/EP2008/056342 International Search Report and Written Opinion, mailed Oct. 8, 2008.
PCT/EP2008/056342, International Preliminary Report on Patentability, dated Nov. 24, 2009.
Communication (Search Report under Section 17 along with Examination Report under Section 18(3), United Kingdom Intellectual Property Office in counterpart U.K. Application GB 0809321.3, dated Oct. 6, 2008.

(56) References Cited

OTHER PUBLICATIONS

Communication Pursuant to Article 94(3) EPC dated Aug. 13, 2009 Patent Application No. 07802544.2.
Communication Pursuant to Article 94(3) EPC dated Nov. 21, 2008, Patent Application No. 07802544.2.
Communication Pursuant to Article 94(3) EPC dated Oct. 30, 2009, European Patent Application No. 08 166 443.5.
PCT/EP2008/063712, Declaration of Non-Establishment of International Search Report, mailed Feb. 27, 2009.
PCT/EP2008/063712 Written Opinion of the International Searching Authority, mailed Feb. 27, 2009.
ETSI TS 100 900 V7.2.0 (Jul. 1999): Digital Cellular Telecommunications System (Phase 2+), Alphabets and language specific-information (GSM 03.38 Version 7.2.0 Release 1998), European Telecommunications Standards Institute, 1999.
Extended European Search Report dated Mar. 17, 2008, EP Application No. 08101544.8.
PCT/EP2008/057880 International Preliminary Report on Patentability, issued Dec. 22, 2009.
PCT/EP2008/057880 PCT International Search Report and Written Opinion, mailed Apr. 22, 2009.
PCT/EP2009/062713 International Search Report and Written Opinion mailed Jan. 14, 2010.
PCT/GB 2007/050723 Invitation to Pay Additional Fees and Communication Relating to the Results of the Partial International Search mailed Apr. 28, 2008.
U.S. Appl. No. 11/888,850 Notice of Allowance, mailed Apr. 2, 2010 (11 pages).
U.S. Appl. No. 11/888,850, Office Action, mailed Aug. 18, 2009.
U.S. Appl. No. 12/077,045 Office Action mailed Apr. 15, 2010.
U.S. Appl. No. 12/077,045 Office Action, mailed Aug. 4, 2009.
U.S. Appl. No. 12/075,853 Office Action, mailed Feb. 2, 2009.
U.S. Appl. No. 12/075,853 Office, mailed Dec. 23, 2009.
U.S. Appl. No. 12/075,853 Office Action, mailed Sep. 29, 2009.
U.S. Appl. No. 12/077,089 Office Action, mailed Feb. 5, 2009.
U.S. Appl. No. 12/077,089 Office Action, mailed Mar. 31.
U.S. Appl. No. 12/077,089 Office Action, mailed Aug. 6, 2009.
PCT/EP2007/061792, International Preliminary Report on Patentability, mailed May 5, 2009.
PCT/EP2007/061792 International Search Report and Written Opinion, mailed Mar. 7, 2008.
U.K. Search Report under Section 17, U.K. Application No. GB0621874.7, dated Feb. 23, 2007.
U.K Further Search Report under Section 17, U.K. Application No. GB0621874.7, dated Jul. 25, 2007.
U.K. Search Report Under Section 17, U.K Application No. GB0716954.3, dated Jan. 2, 2008.
U.K.Search Report under Section 17, U.K. Patent Application No. GB0802986.0, dated Jun. 26, 2008.
UK Application No. GB0802175.0. UKIPO Search Report, dated May 30, 2008.
WAG UAProf Version Oct. 20, 2001; Wireless Application Protocol WAP-248-UAPROF-20011020-a, Wireless Application Protocol Forum, Ltd.; http://www.wapforum.org/what/copyright.htm.
Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.
Internet Reference, "Specific Media Behavioral Targeting Index", Specific Media, Inc., Irvine, CA, 2010, Available online at http://www.specificmedia.com/behavioral-targeting.php.
Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999.
Regelson, Moira et al., "Predicting Click-Through Rate Using Keyword Clusters", Proceedings of the Second Workshop on Sponsored Search Auctions, EC'06, SSA2, Jun. 11, 2006, ACM, 2006.
Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529.
Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010).

\* cited by examiner

MESSAGING SYSTEM

CROSS-REFERENCE TO RELATED APPLICATIONS

This application is a Continuation of application Ser. No. 11/888,446 filed Aug. 1, 2007 now U.S. Pat. No. 7,660,862, which claims priority under 35 USC 119 of GB 0615833.1 filed Aug. 9, 2006, the entire disclosure of each of which is incorporated herein by reference.

FIELD OF THE INVENTION

The present invention relates to a messaging system for creating messages on the basis of actions taken in respect of previously transmitted messages within a communications network, and is particularly, but not exclusively, suited to creating such messages for delivery within a mobile communications network.

BACKGROUND OF THE INVENTION

Currently the Short Message Service (SMS), the Multimedia Messaging Service (MMS) and Wireless Application Protocol (WAP) are the media of choice for personal and service-originated (that is to say information and marketing) mobile messaging. The MMS and WAP services facilitate transmission of messages of unlimited size and virtually any content type within the limitations of mobile terminals, and can be compiled as HTTP messages, which means that they offer a transaction capability with possible super-distribution of content along with accuracy, tracking and feedback of messages. Both messaging types provide a significant improvement—in terms of range and quality of content—over SMS messaging, which is limited to alphanumeric characters.

Telecommunications networks commonly include WAP and Media Gateways, which can track delivery of a WAP and MMS messages to a certain terminal. However, there is no means of identifying what has happened to the message post-delivery: a message can be delivered but deleted before review by the recipient, or forwarded without review by the recipient; in either case current network infrastructure will only be able to track delivery of the message primarily from their gateway elements. This is perhaps not surprising given the responsibility of the network operator, which broadly speaking is limited to the delivery of messages between source and destination addresses. It will be appreciated that influencing a recipient's decision to review a message that has been delivered is quite separate from the mechanics of message transmission, since the latter is dependent on message parameters including sender and content, both of which are often outside of the control of the network operator.

There is therefore a significant difference between delivery of a message and review of the message content, and in view of the fact that subsequent actions taken by the recipient are of interest to the providers of the message content and/or source of the message, there is motivation to develop a means for tracking actions performed in relation to a message subsequent to delivery thereof.

This has been addressed in the field of email messaging, where, as described in U.S. Pat. No. 7,072,947, one solution is to provide an email messaging system arranged to intercept all outgoing emails from a mail server and modify each outgoing email so as to include a tracking code, which is embedded within an image call included in the outgoing email. If the outgoing email contains hyperlinks, each hyperlink is also modified to include the tracking code. The tracking code is uniquely associated with the outgoing email, each individual recipient of the outgoing email (in the case where the outgoing email is addressed to multiple individuals, for example, using the "cc" field of an email), the sender of the outgoing email, or the sender's business association, or a combination thereof. The image call and the embedded tracking code are used to detect when the recipient of the outgoing email has opened an email. The email system associates a cookie with the recipient of the outgoing email, and when the email system receives an image call (i.e. when the recipient has accessed the email), the corresponding image and the cookie are concurrently delivered to the recipient. The cookie is used to monitor the behaviour of the recipient at a website, regardless of how the recipient arrives at that website, be it through a click-through from the email or otherwise.

It will be appreciated that such an arrangement is targeted towards monitoring, in an ongoing sense, user interactions at a given website in the Internet world, and thus that the email message acts as an intermediary to draw traffic to the website containing the information rather than being an end and the primary source of information in itself. It will also be appreciated that because the email provides the means to monitor behaviour at a web site, the process is fairly intensive in terms of usage of network resources when applied to the wireless networks: sending of the email involves one PDP context, the fetching the email from server involves another, pressing the link involves a third context and accessing the third party event server is potentially a fourth context. The number of PDP contexts is the key metric when determining the load on given network elements as well as the technical complexity and infrastructure requirements of such elements for the wireless operators, so it is desirable to minimise the number of contexts involved in message delivery.

SUMMARY OF THE INVENTION

In accordance with a first aspect of the present invention, there is provided a method of selecting a recipient of a message on the basis of data identifying access to previously transmitted messages, each said message comprising content data for display within a display area of a receiving terminal and control data comprising data indicative of a user selectable portion within the display area, the method comprising:

receiving content data having one of a plurality of different types for use in creating a said message;

accessing tracking data corresponding to a previously transmitted message containing content data of a given type, the tracking data being indicative of selection of a said user selectable portion upon display thereof at a said receiving terminal; and selecting a recipient of the message on the basis of the received content data and the tracking data.

Embodiments of the first aspect of the invention thus provide a means of targeting follow-up recipients with content data (such as images, information, presented as text and/or audio), the recipients being known to have previously reviewed and thus become aware of particular types of content. The content data can be characterised by means of various attributes and classified as being of the given, or other, type of content on the basis of the attributes. Alternatively content data can have an identification record associated therewith, identifying its type. This therefore provides a means of categorising content data which is used to match against newly received content data, and thence selection of recipients that have previously reviewed similar content.

According to a second aspect of the present invention there is provided a method of tracking access status of store-and-forward messages transmitted in a communications network, the method comprising:

selecting content for insertion within a store-and-forward message, the content including data for display within a display of a receiving teminal and control data comprising data indicative of a user selectable portion within the display, said display data including data for display in the user selectable portion;

creating a store-and-forward message comprising the selected content for transmission to a receiving terminal;

transmitting the created store-and-forward message to the receiving terminal; and responsive to receipt of data indicative of selection of the user selectable portion within the display, modifying the access status of the transmitted store-and-forward message, wherein the display data and the control data originate from a network location other than a terminal adapted to send messages in the communications network.

Embodiments of the second aspect of the invention thus apply to messages such as WAP, MMS and SMS messages, and operate so as to assemble a message from content and a user selectable portion that have not originated as a message from another terminal.

Embodiments of the various aspects of the invention differ substantially from arrangements such as that described in U.S. Pat. No. 7,072,947 on two levels: firstly in the relationship between the tracking code and the content of the message, and secondly in the way in which tracking data are used and how the system is implemented in wireless data network context. In relation to the first point of distinction, the information that the sender of the message wants the recipient to see is contained within the message itself, rather than being accessible via a link. This means that the tracking data indicate exactly what information has been reviewed as opposed to providing an indication that a particular web page (which might change over time) has been viewed. It is precisely this distinction that enables embodiments of the invention to be realised: future recipients of messages can be selected on the basis of them having already reviewed at least one previously transmitted message containing information of the same, similar, or related in a known manner, type, which has the advantage of enabling advertisers, for example, to target future messages more accurately than is currently possible.

Since the content data are included within the message instead of being accessible via a link, a further advantage of embodiments of the invention is that there is no need for the recipient to wait for various handshake and connectivity actions to be completed before viewing the content data. In addition to this being advantageous from the point of view of the end user, it is also beneficial from the point of view of utilisation of network resources, since fewer network resources (in terms of numbers and duration) are required.

The receiving terminal can operate in one of a plurality of modes in dependence on selection of the user selectable portion; one such mode involves the receiving terminal sending a response message identifying the receiving terminal to the network location, which causes the access status of the message to be updated at the network location.

The control data can comprise a set of processable instructions for use in controlling operation of a receiving terminal in dependence on selection of the user selectable portion: for example, in one arrangement the control data can comprise data that cause the receiving terminal to send the response message to the network location from which the store-and-forward message is transmitted. Alternatively the control data comprise data that cause the receiving terminal to send the response message to a network location other than that from which the store-and-forward message is transmitted.

Once a response message has been received, the method preferably comprises updating the access status of the content data, so as to identify the receiving terminal from which the selection data (in the form of a response message) have emanated.

According to a further aspect of the present invention there is provided a system for performing the aforesaid methods.

The features and advantages described in the dependent claims of the application will become apparent from the following description of preferred embodiments of the invention, given by way of example only, which is made with reference to the accompanying drawings.

DETAILED DESCRIPTION OF THE INVENTION

Embodiments of the invention are concerned with tracking user access to messages, specifically tracking access by capturing an action taken by the user in relation to the message, and using that information to determine content and/or recipients of subsequent messages. The content of the messages being tracked and the nature of the action being taken will be described in detail later in the description, but first a description of the infrastructure needed to support the delivery and tracking of the message will be described.

Figure 1:
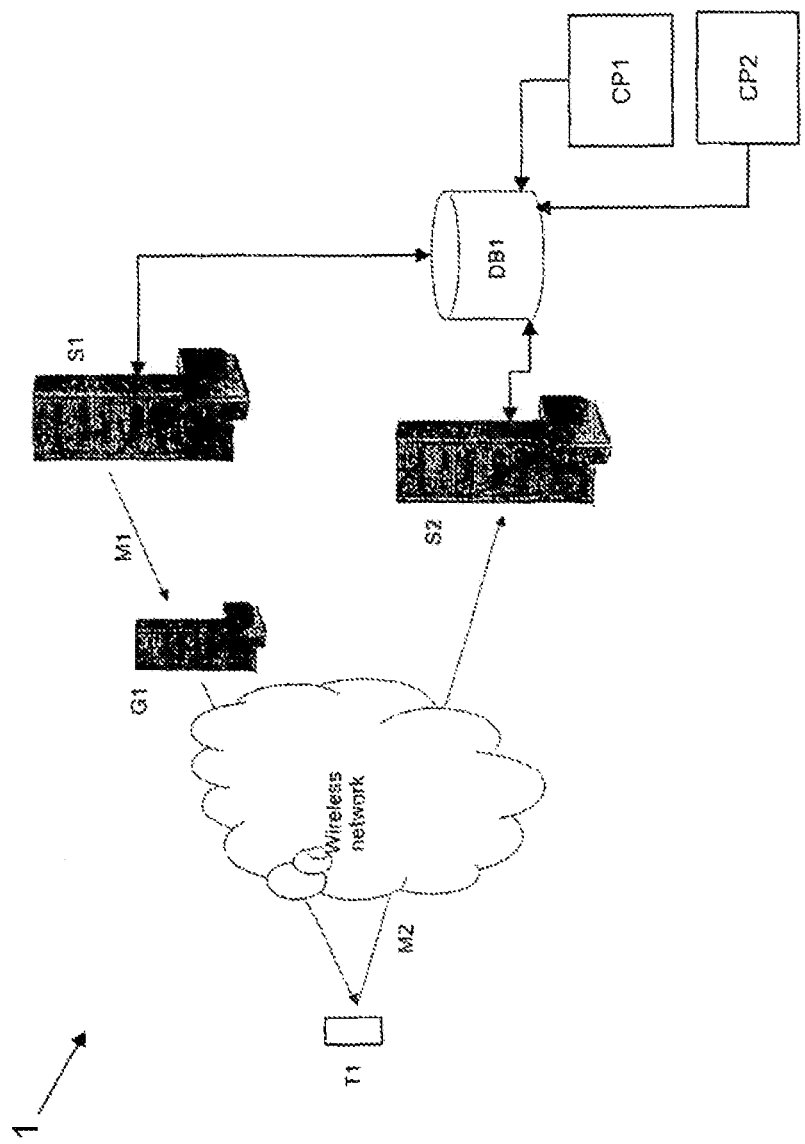
FIG. 1 is a schematic diagram showing a mobile network and network components arranged in accordance with an embodiment of the invention.

FIG. 1 shows an example of a data messaging system 1 within which embodiments of a first aspect of the invention operate; the arrows indicate data flows within the data messaging system 1 and the objects indicate components of the data messaging system 1. This Figure shows an arrangement of network components suitable for the delivery of WAP messages, but the messages could be short messages (SMS), Multimedia messages (MMS messages), bespoke messages in the form of GPRS data and/or streamed data; as will be appreciated, the specific arrangement of the data messaging system 1 is dependent on the type of message being transmitted.

In the arrangement shown in FIG. 1, a terminal MS communicates with various network devices within the data messaging system 1. The terminal T1 may be a wireless terminal such as a mobile phone, a PDA or a Laptop computer. The data messaging system 1 comprises: a WAP gateway G1, which is typically a network operator's WAP gateway; Web and WAP services servers S1, S2; and a database DB1, arranged to store data in respect of subscribers of the data messaging system 1; data in respect of terminals such as T1; and data in respect of content, including image (static, dynamic and/or interactive images), alphanumeric characters and content control information, the data having been provided by various content providers CP1, CP2. The subscriber data include tracking data indicative of actions taken on the part of the subscriber in relation to messages previously transmitted via the data messaging system 1, these messages being identified by the content included therein.

In one arrangement the services servers S1, S2 and the database DB1 are located within a proprietary network, which means that they operate independently of any specific network operator and can be shared across a plurality of network operators. The database DB1 can either be provided by two separate databases or by a single database as shown in FIG. 1, and, while the services servers S1, S2 are shown as two distinct network components, they can alternatively be embodied as one physical device equipped with the functionality corresponding to the respective servers and described below. Using techniques known in the art, the database DB1 can store preference and demographic data relating to subscribers, these data being used to control selection of content as described below.

Figure 2:
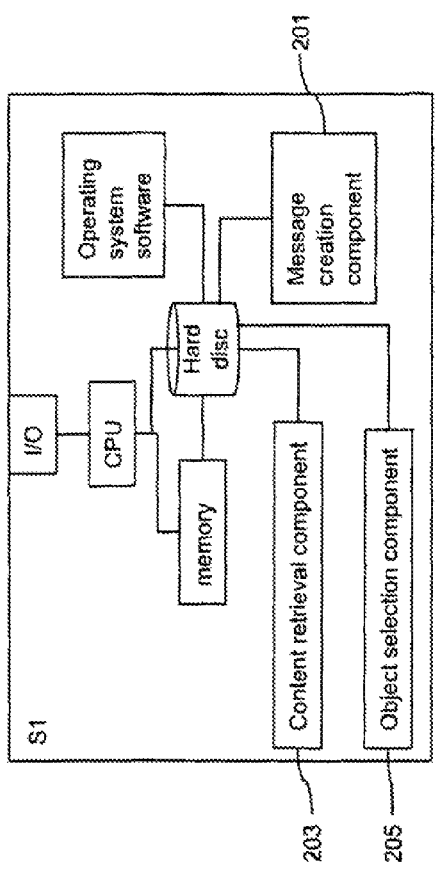
FIG. 2 is a schematic block diagram showing in detail the functionality associated with a first service server shown in FIG. 1.
Figure 3:
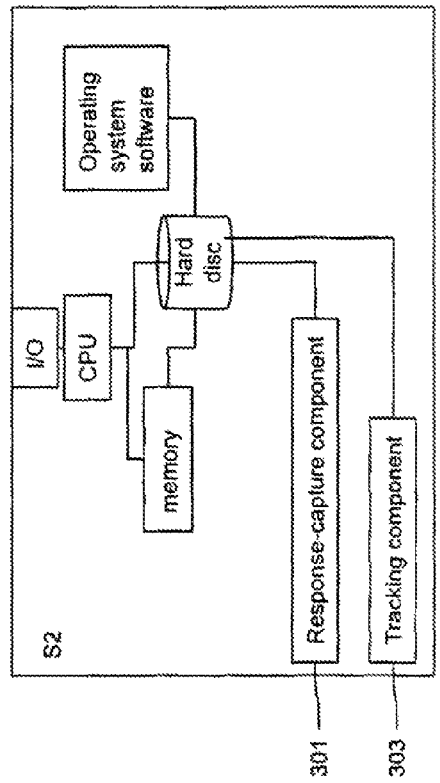
FIG. 3 is a schematic block diagram showing in detail the functionality associated with a second service server shown in FIG. 1.
Figure 4:
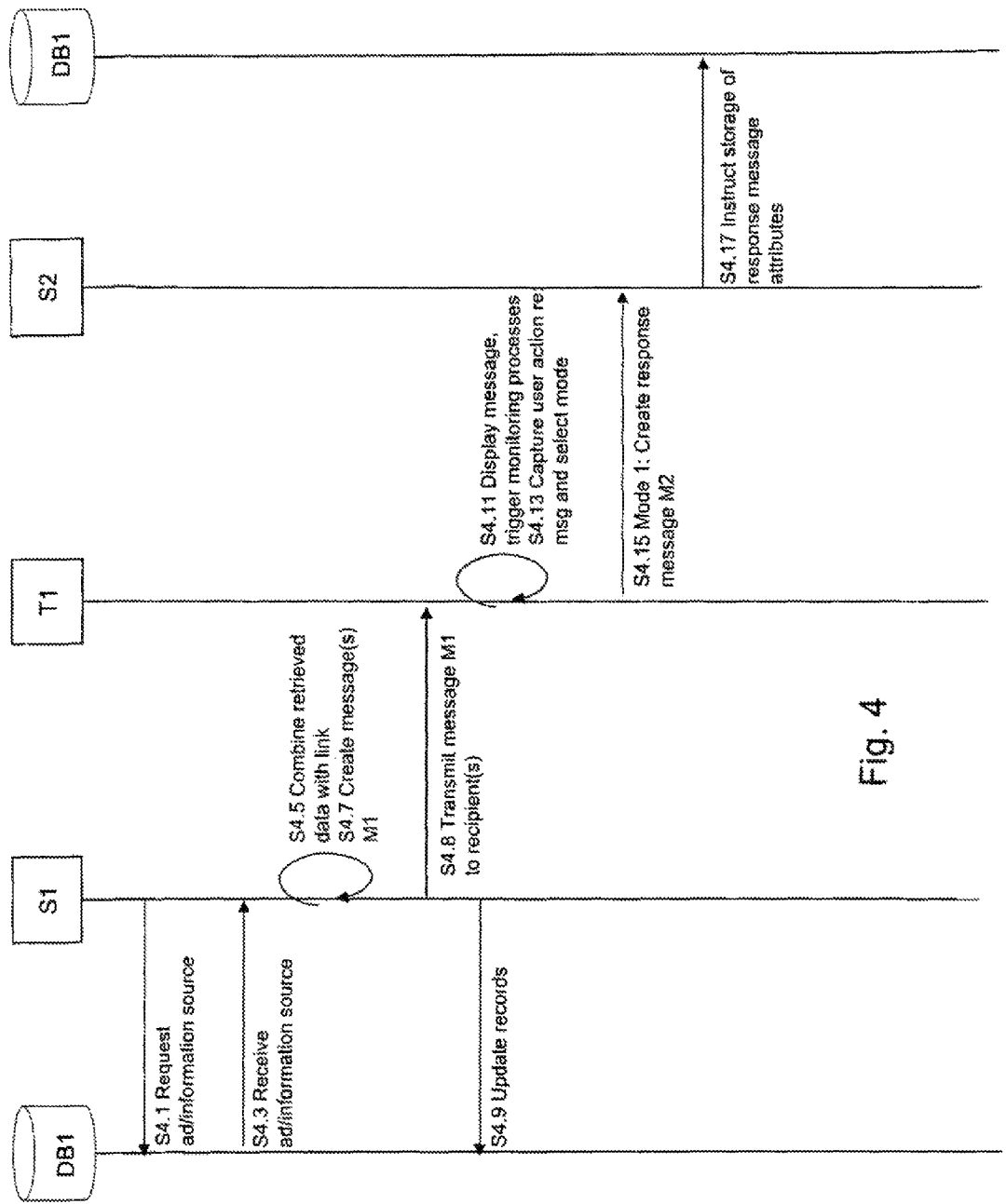
FIG. 4 is a timing diagram showing flow of messages between the network components shown in FIG. 1 according to an embodiment of the invention.

The functionality of the services servers S1, S2 will now be described with reference to FIGS. 2, 3 and 4. In addition to standard CPU, memory, data bus, Input/Output ports, data storage, and operating system programs, the first server S1 comprises certain bespoke functional components, namely message creation software component 201 for creating messages, content retrieval component 203 and object selection component 205, the latter two components 203, 205 being arranged to select data for insertion within the message. The message creation software component 201 triggers message creation based on either recipient or content as a pre-specified starting point. In other words, the message creation component 201 is either arranged to identify one or more message recipients and trigger retrieval of content for those recipients, or to identify content and trigger retrieval of recipients for the content.

In a first embodiment, a group of recipients is specified and content selected on the basis of the recipients. Accordingly, the characteristics of the group are used to define parameters that are used to retrieve the message content. The query can be formulated on the basis of parameters such as type of image, subject matter, date, etc. which have been formulated on the basis of demographic and preference data corresponding to the group of recipients. Once these parameters have been defined the content retrieval software component 203 is triggered to pass a query to the database DB1 (step S4.1), causing the database DB1 to query its records according to the parameters. In one arrangement the database DB1 is configured with filtering and matching functions known in the art for use in identifying records corresponding to the query, and the content identified by these functions is passed to the retrieval software component 203, together with a content identifier ID (step S4.3).

The first services server S1 also includes an object selection software component 205, which is arranged to identify control data specifying one or more user selectable objects for insertion within the message. The object can take the form of a push button or a link (such as a URL), either of which can be overlayed upon the content retrieved by the retrieval software component 203 or presented separate therefrom (e.g. in a different region of the display area of the recipient's terminal). As a further alternative the object selection component 205 can modify a portion of the retrieved content such that, when rendered on a display, the portion is highlighted in some manner (thus in this instance the object causes part of the content to stand out from other parts of the content). The choice of object type can be dependent on type of message being created, since certain types of messages inherently include means for specifying a particular type of object (e.g. HTTP links can be embedded within MMS and WAP messages), while others, such as SMS, do not. Thus, in addition to identifying an object, the control data can include a set of processable instructions, e.g. in the form of a script or the like, which can be processed by a recipient's terminal so as to control rendering of the object and to trigger the recipient's terminal to perform certain actions in response to selection of the object. One such action is for the recipient's terminal to transmit a response message, and the control data include data specifying a network address to which such response messages are to be sent. In one arrangement the network address is that of the second services server S2.

The message creation component 201 is arranged to combine the control data with the content retrieved at step S4.3 so as to create a message body (step S4.5) for each of the recipients. In addition to the control data and retrieved content, the body of these messages includes a content identifier ID, and the body of the message is encapsulated within a message M1 for transmission to each recipient (steps S4.7, S4.8). Once these steps have been completed, the message creation component 201 is arranged to instruct the database DB1 to record the content identifier ID, object type and time of message transmission against each of the recipients (step S4.9).

Once received at a recipient terminal T1, and assuming the message M1 to have been selected by the user for display, the content and object within the message are displayed in accordance with the control data within the message body (step S4.11). In addition, the control data arms the recipient's terminal to monitor for selection of the object, and in response to selection thereof, causes the recipient's terminal to formulate and transmit a response message M2 (step S4.13, S4.15). In its simplest form the body of the response message M2 simply comprises the content identifier ID corresponding to the selected content, and in cases where the object is a URL or similar link, the content identifier ID and network address to which the response messages are to be transmitted can be embedded within the link. Selection of the link triggers formulation of a response message M2 on the basis of data embedded within the link as is known in the art.

Figure 5:
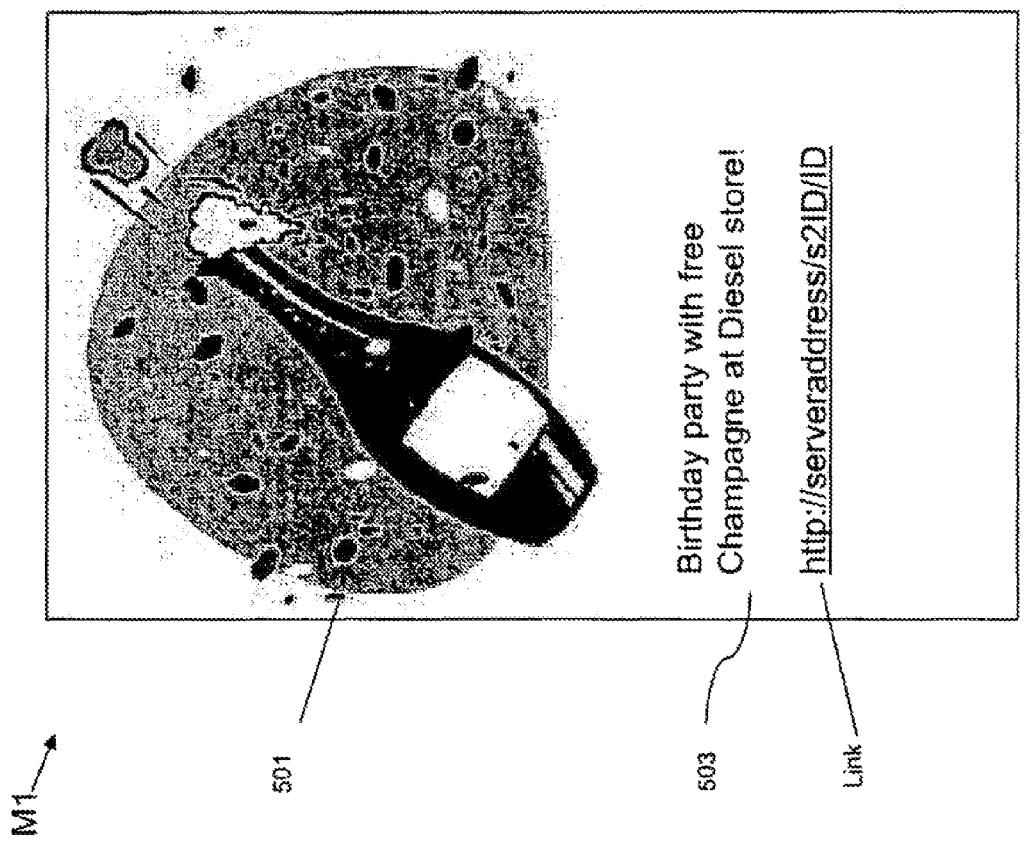
FIG. 5 is schematic diagram showing an example MMS message according to an embodiment of the invention.

When an MMS message includes images and audio portions, such portions are typically embedded within a presentation part of the message, meaning that the content type of the MMS message is application/vnd.wap.multipart.related, thereby identifying the message to comprise several parts. FIG. 5 shows an example.MMS message M1 that has been compiled with the Smil™ language having image portion 501 and text portion 503. A suitable presentation part for this message M1 reads as follows:

```
<smil>
  <head>
    <layout>
      <root-layout width="160" height="140"/>
      <region id="Image" width="160" height="120" left="0" top="0"/>
      <region id="Text" width="160" height="20" left="0" top="120"/>
    </layout>
  </head>
  <body>
    <img src="Champagne.gif" region="Image" />
    <text src="Birthday party with free Champagne at Diesel store!region="Text"/>
```

```
<text src="http://serveraddress/s2ID/ID/region="Text">
</body>
</smil>
```

Instead of displaying the server address, the URL is preferably masked by means of a plain text phrase (e.g. "I will attend"), by means of HTML markup adapted for MMS.

Alternatively, and for example in the case of SMS messages, a "ready-made" response message M2 (with source (recipient) and destination (second services server S2) address and content identifier ID in the message body) can be encapsulated within message M1, which means that the action to be taken on the part of the recipient's terminal in response to selection of the object is simply to extract and transmit the ready-made message M2. In a further arrangement, the set of processable instructions causes the recipient's terminal to retrieve the content identifier ID from message M1 and to create the response message M2 having, as message body, the content identifier ID, and transmit this to the second services server S2. As an alternative to the message body of the response message M2 comprising the content identifier ID, the response message could include the content itself.

The latter two arrangements require the recipient's device to comprise a bespoke software application that can access SMS messages stored in the inbox so as to perform the above-mentioned functions; such an application could be embodied for example as a Symbian Series 60-compatible application or with a mobile operating system with similar capabilities. Alternatively the recipient's terminal could be equipped with a SIM Toolkit that has access to SMS messages stored in the SIM card. A drawback of these arrangements is that the original SMS message would have to include the identifier data, and would thus be displayed to the recipient. However, provided the content of the message is short, the identifier data could, for example, be separated therefrom by means of characters from the ASCII set that enable a clear delineation between message content and control data.

In the foregoing aspect of the invention, the messaging types have been described as store-and-forward messages such as SMS, MMS and WAP—each of which is stored in a network node until such time as delivery is possible to the intended recipient. Thus in comparison to prior art relating to email, such as is described in U.S. Pat. No. 7,072,947, there are only two contexts to be processed: a first context to send the message to the user and a second context when the object is selected. Tracking of access to messages thus involves fewer processing requirements than is required with known systems (from four to two), and incurs a corresponding reduction in network capacity and/or elements required to deliver the messages in a wireless data network or a network containing wireless elements. In addition, when the message M1 is an MMS or WAP message, mobile terminals are not required to be equipped with mobile client applications to benefit from embodiments of the invention, so that content can be sent to a wider range of terminals, and thus recipients.

Turning back to FIG. 3, since the response message M2 has, as its destination address, the second services server S2, any such response message M2 will be delivered thereto. As can be seen from FIG. 3, the second services server S2 includes a response-capture component 301, to which all response messages received by the second server S2 are directed, and a tracking component 303, which evaluates the response messages according to one or more criteria. Upon receipt of a response message, the response-capture component 301 is arranged to identify the terminal from which the response message emanates and to instruct the database DB1 update a recipient record with data identifying time of receipt of the response message and the content identifier ID (step S4.17). This enables the tracking component 303 to evaluate recipient access to the transmitted message, and thus to the content. In the case where the content comprises advertising material in particular, the message creation component 201 can make use of this information when subsequently creating messages having pre-specified content. In other words, given it is known that certain recipients have reviewed certain types of content, the message creation component 201 can target those recipients with similar advertisements when creating future messages.

Figure 6:
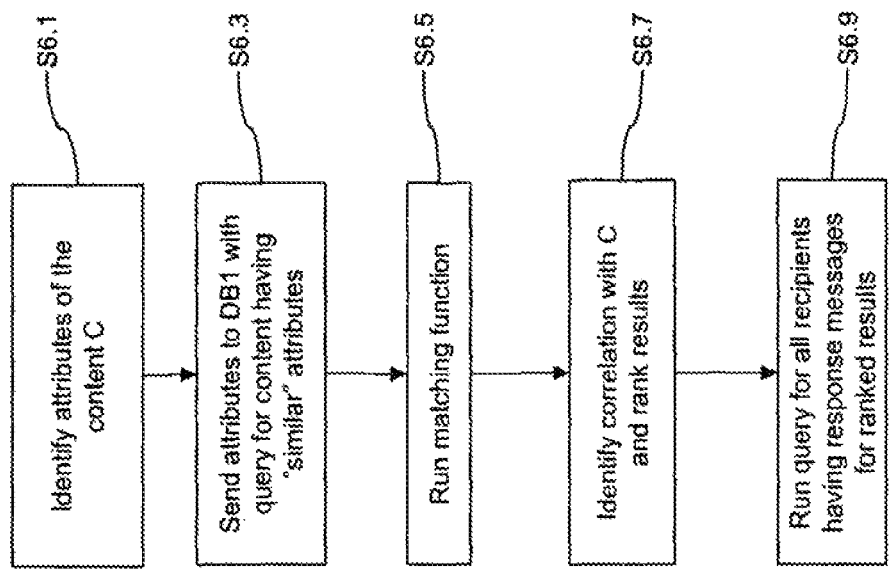
FIG. 6 is a schematic flow diagram showing a process for selecting recipients of a message according to an embodiment of the invention.

A process for performing such selection will now be described with reference to FIG. 6, in which it is assumed that the message creating component 201 has been provided with content C from content provider CP1. At step S6.1, the message creating component 201 identifies attributes of the content C, these typically being specified by the content provider CP1 and accompanying the content C in the form of a content identification record. The message creating component 201 then sends (step S6.3) a query to the database DB1 for previously transmitted content that matches the attributes identified at step S6.1. The database DB1 can invoke a matching algorithm which performs a search for previously transmitted content having all of the specified attributes, content having attributes synonymous with those specified, and content having one, two etc. of the specified attributes (step S6.5). Alternatively, the content identification record accompanying content C can include an identifier of previously provided, and related, content, for use in performing the search.

Content identifiers corresponding to the related and previously transmitted content are ranked in accordance with the correlation between their attributes and those of content C (sent in the query at step S6.3), and a ranked list is transmitted to the message creating component 201 at step S6.7. Once a list of all previously sent "similar" content has been established, the message creating software component 201 sends a query for recipients that have viewed the previously transmitted content for some or all of the content in the ranked list. This causes the database DB1 to retrieve details of all those recipients for which response messages M2 were received (step S6.9) and send the details to the message creating software component 201, for use in formulating messages having content C. It is to be noted that such subsequently transmitted messages can be formulated so as to include or exclude user selectable objects.

This therefore provides a mechanism for targeting follow-up advertisements to recipients that are known to have previously reviewed and thus become aware of particular advertisements.

Additional Details

For WAP type messages, the WAP gateway G1 can transmit data indicative of the messages being delivered to respective terminals, and this can be used to review the response messages, specifically to rank recipients that have transmitted response messages in terms of latency between delivery and review.

Whilst in the above the messaging types have been described as store-and-forward messages such as SMS, MMS and WAP, in relation to the aspect of selecting future recipients for receipt of content, the messaging type could include email messages, where emails are delivered to an email server corresponding to the domain of the recipient, and the email server of the recipient to creates and delivers a copy of the email to the recipient.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method comprising:
   sending, by a processor, a first message to a first recipient's terminal, the first message including a first content selected from a database, the first content including:
      data for display within a display of a receiving terminal, and
      control data comprising data indicative of a user selectable portion within the display, wherein the control data, in response to selection thereof, is configured to cause the receiving terminal to formulate and transmit a response message to register selection of the user selectable portion, wherein the control data includes a ready-made response message that includes a source address, destination address and a content identifier that identifies the first content;
   responsive to receipt of the response message comprising data indicative of selection of the user selectable portion within the display, modifying, by the processor, an access status of the transmitted message, wherein the access status indicates that the user selectable portion of the first message was selected by the first recipient;
   identifying, by the processor, attributes of a second content, different than the first content;
   querying, by the processor, the database to identify previously transmitted content items having similar attributes to the identified attributes of the second content;
   determining, by the processor, that the second content shares at least a predetermined number of attributes with the first content;
   inserting, by the processor, the second content into a second message; and
   transmitting, by the processor, the second message to the first recipient.

2. The computer implemented method of claim 1, wherein the control data includes a set of instructions which can be processed by the receiving terminal.

3. The computer implemented method of claim 2, wherein the set of instructions is a script.

4. The computer implemented method of claim 1, wherein the control data causes the receiving terminal to:
   retrieve the content identifier from the message; and
   create the response message having a message body including the retrieved content identifier ID.

5. The computer implemented method of claim 1, wherein the receiving terminal operates in one of a plurality of modes in dependence on selection of the user selectable portion.

6. The computer implemented method of claim 5, wherein a first mode comprises the receiving terminal sending the response message identifying the receiving terminal to the network location, and the access status of the message is updated at the network location.

7. The computer implemented method of claim 1, wherein the control data further comprise data identifying another network location, for use in formulating the response message.

8. The computer implemented method of claim 1, wherein modifying an access status of the transmission further comprises updating the access status so as to identify the receiving terminal from which the selection data has emanated.

9. The computer implemented method of claim 1, wherein the display data comprises image data and the user selectable portion is an integral part of the image data.

10. The computer implemented method of claim 1, wherein the content is associated with an attribute.

11. The computer implemented method of claim 10, wherein modifying the access status of the transmitted message includes updating the recipient record to include the attribute associated with the selected first content in the transmitted message.

12. The computer implemented method of claim 1, wherein the second message includes content associated with the content of the first message.

13. A system comprising:
   a processor; and
   a memory containing instructions that, when executed, cause the processor to:
      send a first message to a first recipient's terminal, the first message including a first content selected from a database, the first content including:
         data for display within a display of a receiving terminal, and
         control data comprising data indicative of a user selectable portion within the display, wherein the control data, in response to selection thereof, is configured to cause the receiving terminal to formulate and transmit a response message to register selection of the user selectable portion, wherein the control data includes a ready-made response message that includes a source address, destination address and a content identifier that identifies the first content;
      responsive to receipt of the response message comprising data indicative of selection of the user selectable portion within the display, modify an access status of the transmitted message, wherein the access status indicates that the user selectable portion of the first message was selected by the first recipient;
      identify attributes of a second content, different than the first content;
      query the database to identify previously transmitted content items having similar attributes to the identified attributes of the second content;
      determine that the second content shares at least a predetermined number of attributes with the first content;
      insert the second content into a second message; and
      transmit the second message to the first recipient.

14. A non-transitory computer-readable medium containing instructions that, when executed by a computing device, cause the computing device to:
   send a first message to a first recipient's terminal, the first message including a first content selected from a database, the first content including:
      data for display within a display of a receiving terminal, and
      control data comprising data indicative of a user selectable portion within the display, wherein the control data, in response to selection thereof, is configured to cause the receiving terminal to formulate and transmit a response message to register selection of the user selectable portion, wherein the control data includes a ready-made response message that includes a source address, destination address and a content identifier that identifies the first content;
responsive to receipt of the response message comprising data indicative of selection of the user selectable portion within the display, modify an access status of the transmitted message, wherein the access status indicates that the user selectable portion of the first message was selected by the first recipient;
identify attributes of a second content, different than the first content;
query the database to identify previously transmitted content items having similar attributes to the identified attributes of the second content;
determine that the second content shares at least a predetermined number of attributes with the first content;
insert the second content into a second message; and
transmit the second message to the first recipient.

15. The system of claim 13, wherein the control data includes a set of instructions which can be processed by the receiving terminal.

16. The system of claim 15, wherein the set of instructions is a script.

17. The system of claim 13, wherein the control data causes the receiving terminal to:
retrieve the content identifier from the message; and
create the response message having a message body including the retrieved content identifier ID.

18. The system of claim 13, wherein the receiving terminal operates in one of a plurality of modes in dependence on selection of the user selectable portion.

19. The system of claim 18, wherein a first mode comprises the receiving terminal sending the response message identifying the receiving terminal to the network location, and the access status of the message is updated at the network location.

20. The system of claim 13, wherein the control data further comprise data identifying another network location, for use in formulating the response message.

21. The system of claim 13, wherein modifying an access status of the transmission further comprises updating the access status so as to identify the receiving terminal from which the selection data has emanated.

22. The system of claim 13, wherein the display data comprises image data and the user selectable portion is an integral part of the image data.

23. The system of claim 13, wherein the content is associated with an attribute.

24. The system of claim 23, wherein modifying the access status of the transmitted message includes updating the recipient record to include the attribute associated with the selected first content in the transmitted message.

25. The system of claim 13, wherein the second message includes content associated with the content of the first message.

26. The non-transitory computer-readable medium of claim 14, wherein the control data includes a set of instructions which can be processed by the receiving terminal.

27. The non-transitory computer-readable medium of claim 26, wherein the set of instructions is a script.

28. The non-transitory computer-readable medium of claim 14, wherein the control data causes the receiving terminal to:
retrieve the content identifier from the message; and
create the response message having a message body including the retrieved content identifier ID.

29. The non-transitory computer-readable medium of claim 14, wherein the receiving terminal operates in one of a plurality of modes in dependence on selection of the user selectable portion.

30. The non-transitory computer-readable medium of claim 29, wherein a first mode comprises the receiving terminal sending the response message identifying the receiving terminal to the network location, and the access status of the message is updated at the network location.

31. The non-transitory computer-readable medium of claim 14, wherein the control data further comprise data identifying another network location, for use in formulating the response message.

32. The non-transitory computer-readable medium of claim 14, wherein modifying an access status of the transmission further comprises updating the access status so as to identify the receiving terminal from which the selection data has emanated.

33. The non-transitory computer-readable medium of claim 14, wherein the display data comprises image data and the user selectable portion is an integral part of the image data.

34. The non-transitory computer-readable medium of claim 14, wherein the content is associated with an attribute.

35. The non-transitory computer-readable medium of claim 34, wherein modifying the access status of the transmitted message includes updating the recipient record to include the attribute associated with the selected first content in the transmitted message.

36. The non-transitory computer-readable medium of claim 14, wherein the second message includes content associated with the content of the first message.

* * * * *